(12) United States Patent
Hu et al.

(10) Patent No.: US 11,943,498 B2
(45) Date of Patent: Mar. 26, 2024

(54) DISPLAY METHOD, DISPLAY TERMINAL AND NON-TRANSITORY COMPUTER READABLE STORAGE MEDIUM

(71) Applicant: SHENZHEN SKYWORTH-RGB ELECTRONIC CO., LTD., Shenzhen (CN)

(72) Inventors: Lingchao Hu, Shenzhen (CN); Weixiong Chen, Shenzhen (CN); Yunian Wang, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 118 days.

(21) Appl. No.: 17/533,481

(22) Filed: Nov. 23, 2021

(65) Prior Publication Data
US 2022/0086522 A1    Mar. 17, 2022

Related U.S. Application Data

(63) Continuation of application No. PCT/CN2020/114387, filed on Sep. 10, 2020.

(30) Foreign Application Priority Data

Sep. 16, 2019   (CN) .......................... 201910872151.9

(51) Int. Cl.
*H04N 21/431*    (2011.01)
*H04N 21/41*    (2011.01)
*H04N 21/81*    (2011.01)

(52) U.S. Cl.
CPC ..... *H04N 21/4316* (2013.01); *H04N 21/4131* (2013.01); *H04N 21/8126* (2013.01)

(58) Field of Classification Search
None
See application file for complete search history.

(56) References Cited

U.S. PATENT DOCUMENTS

| 2019/0122121 | A1 | 4/2019 | Yu | |
|---|---|---|---|---|
| 2020/0007357 | A1* | 1/2020 | Kim | ..................... G01S 15/8993 |
| 2022/0272409 | A1* | 8/2022 | Lee | ..................... H04N 21/4131 |

FOREIGN PATENT DOCUMENTS

| CN | 102360266 A | 2/2012 |
|---|---|---|
| CN | 103607626 A | 2/2014 |

(Continued)

OTHER PUBLICATIONS

Examination Report issued in counterpart Indian Patent Application No. 202127052536, dated Apr. 25, 2022.

(Continued)

*Primary Examiner* — Samira Monshi
(74) *Attorney, Agent, or Firm* — Westbridge IP LLC

(57) ABSTRACT

Disclosed are a display method, a display terminal and a non-transitory computer readable storage medium. The display method includes: after receiving a wake-up signal, obtaining description information fed back by a corresponding smart terminal according to the wake-up signal, and generating AIoT display information of the display terminal comprising the description information; and dividing a display area of the display terminal into at least two non-overlapping areas, displaying a current playback screen of the display terminal in one area of the at least two non-overlapping areas, and displaying the AIoT display information in another area of the at least two non-overlapping areas.

17 Claims, 12 Drawing Sheets

(56) References Cited

FOREIGN PATENT DOCUMENTS

| CN | 105302423 A | 2/2016 |
|---|---|---|
| CN | 105357571 A | 2/2016 |
| CN | 106658115 A | 5/2017 |
| CN | 106681584 A | 5/2017 |
| CN | 109688445 A | 4/2019 |
| CN | 110164441 A | 8/2019 |
| CN | 110620948 A | 12/2019 |
| EP | 2955815 A1 | 12/2015 |
| JP | 2012029064 A | 2/2012 |
| WO | 2016150121 A1 | 9/2016 |

OTHER PUBLICATIONS

Supplementary European Search Report issued in counterpart European Patent Application No. 20864649.7, dated Jan. 3, 2023.
First Office Action issued in counterpart Chinese Patent Application No. 201910872151.9, dated Feb. 2, 2021.
International Search Report and Written Opinion issued in corresponding PCT Application No. PCT/CN2020/114387, dated Dec. 8, 2020.
Notification to Grant Patent Right for Invention issued in counterpart Chinese Patent Application No. 201910872151.9, dated Apr. 8, 2021.
Yang, The color TV market turns to the era of smart "screen" AIoT is the way to break the game? China Electronic News, Issue 60, China, dated Aug. 23, 2019.

\* cited by examiner when the object sending the wake-up signal is an associated smart terminal, obtaining prompt information corresponding to the associated smart terminal, and using the prompt information as obtained description information fed back by the corresponding smart terminal ⟶ S13

FIG. 4 obtaining status information of other associated smart terminals except the smart terminal that feeds back the description information, and sorting icons of all associated smart terminals in a preset order, wherein an icon of the smart terminal that feeds back the description information is in a first position, after determining the icon in the first position, sorting the icons according to a remaining time in the status information in ascending order or a degree of relevance to the description information — S30 displaying the sorted icons in the menu display area — S40

FIG. 6

DISPLAY METHOD, DISPLAY TERMINAL AND NON-TRANSITORY COMPUTER READABLE STORAGE MEDIUM

CROSS-REFERENCE TO RELATED APPLICATIONS

This application is a continuation application of International Application No. PCT/CN2020/114387, filed on Sep. 10, 2020, which claims priority to Chinese Patent Application No. 201910872151.9, filed on Sep. 16, 2019, the entire disclosures of which are incorporated herein by reference.

TECHNICAL FIELD

The present disclosure relates to the computer field, and in particular to a display method, a display terminal and a non-transitory computer readable storage medium.

BACKGROUND

In recent years, the integration of artificial intelligence (AI) and Internet of Things (IoT) has become a trend. "AI+IoT" is AIoT, which refers to the integration of artificial intelligence technology and the Internet of Things in practical applications, that is, the intelligent Internet of Things. AIoT technology has been applied in the TV field, which can realize the interconnection of various home appliances and realize smart home life. However, when the existing AIoT screen information appears, the TV program currently being watched by the user is often paused, thereby affecting the normal viewing of the user.

SUMMARY

The present disclosure provides a display method, a display terminal and a non-transitory computer readable storage medium, aiming to solve the problem that the TV program currently being watched by the user will be paused when the AIoT screen information appears.

In order to achieve the above objective, the present disclosure provides a display method, including the following operations:
  after receiving a wake-up signal, obtaining description information fed back by a corresponding smart terminal according to the wake-up signal, and generating AIoT display information of the display terminal including the description information; and
  dividing a display area of the display terminal into at least two non-overlapping areas, displaying a current playback screen of the display terminal in one area of the at least two non-overlapping areas, and displaying the AIoT display information in another area of the at least two non-overlapping areas.

In an embodiment, the operation of obtaining description information fed back by a corresponding smart terminal according to the wake-up signal includes:
  determining an object sending the wake-up signal; and
  when the object sending the wake-up signal is a user, obtaining a user instruction from the wake-up signal, and determining a smart terminal that needs to be awakened according to the user instruction, to obtain the description information fed back by the smart terminal after receiving the user instruction.

In an embodiment, the operation of obtaining the description information fed back by the smart terminal after receiving the user instruction includes:
  when the smart terminal that needs to be awakened is an associated smart terminal, obtaining execution status information of the associated smart terminal after receiving the user instruction and recommendation information associated with the user instruction, and using the execution status information and the recommendation information associated with the user instruction as the description information fed back by the associated smart terminal; and
  when the smart terminal that needs to be awakened is the display terminal itself, obtaining a local application corresponding to the user instruction to receive the description information fed back by the local application.

In an embodiment, after the operation of determining an object sending the wake-up signal, the display method further includes:
  when the object sending the wake-up signal is an associated smart terminal, obtaining prompt information corresponding to the associated smart terminal, and using the prompt information as description information fed back by the corresponding smart terminal.

In an embodiment, the at least two non-overlapping areas further include a menu display area;
  before the operation of dividing a display area of the display terminal into at least two non-overlapping areas, the display method further includes:
  obtaining status information of other associated smart terminals except the smart terminal that feeds back the description information, and sorting icons of all associated smart terminals in a preset order, wherein an icon of the smart terminal that feeds back the description information is in a first position, after determining the icon in the first position, sorting the icons according to a remaining time in the status information in ascending order or a degree of relevance to the description information; and
  displaying the AIoT display information in another area of the at least two non-overlapping areas and displaying the sorted icons in the menu display area.

In an embodiment, after the operation of obtaining status information of other associated smart terminals except the smart terminal that feeds back the description information, the display method further includes:
  associating status information of each other associated smart terminal with a corresponding icon;
  after the operation of displaying the sorted icons in the menu display area, the display method further includes:
  in response to detecting a movement instruction in the menu display area, determining a pointed icon after completion of the movement instruction to obtain status information associated with the pointed icon, and replacing the AIoT display information in another area of the at least two non-overlapping areas with new AIoT display information including the status information associated with the pointed icon.

In an embodiment, after the operation of displaying the AIoT display information in another area of the at least two non-overlapping areas, the display method further includes:
  detecting whether feedback information sent by an input device or a user is received; and
  in response to receiving the feedback information sent by the input device or the user, restoring the divided display area of the display terminal to an initial state.

In an embodiment, after the operation of detecting whether feedback information sent by an input device or a user is received, the display method further includes:

in response to a determination that no feedback information from the input device or the user is received, determining whether a display time corresponding to the AIoT display information has reached a preset display time; and in response to a determination that the display time corresponding to the AIoT display information has reached the preset display time, restoring the divided display area of the display terminal to the initial state.

Besides, in order to achieve the above objective, the present disclosure further provides a display terminal, including: a communication module, a memory, a processor, and a computer program stored in the memory and executed by the processor, the computer program, when executed by the processor, performs the operations of the display method as described above.

Besides, in order to achieve the above objective, the present disclosure further provides a non-transitory computer readable storage medium. A computer program is stored in the non-transitory computer readable storage medium, the computer program, when executed by a processor, performs the operations of the display method as described above.

The present disclosure provides a display method, including: after receiving wake-up signal, obtaining description information fed back by a corresponding smart terminal according to the wake-up signal, and generating AIoT display information of the display terminal including the description information; and dividing a display area of the display terminal into at least two non-overlapping areas, displaying a current playback screen of the display terminal in one area of the at least two non-overlapping areas, and displaying the AIoT display information in another area of the at least two non-overlapping areas. When displaying AIoT information, the display area is divided into at least two non-overlapping areas, one area of which displays the TV program being played on the TV, while the other area displays the AIoT information. When the AIoT information appears, it will not affect the TV program currently being played, and the AIoT information will not cover the TV program currently being played, and will not affect the normal viewing of the user.

BRIEF DESCRIPTION OF THE DRAWINGS

FIG. 4 is a schematic flowchart of determining an object sending a wake-up signal in the display method according to the present disclosure.

FIG. 6 is a schematic flowchart of the display method according to a fourth embodiment of the present disclosure.

DETAILED DESCRIPTION OF THE EMBODIMENTS

It should be understood that the specific embodiments described herein are only used to explain the present disclosure, and are not intended to limit the present disclosure.

Figure 1:
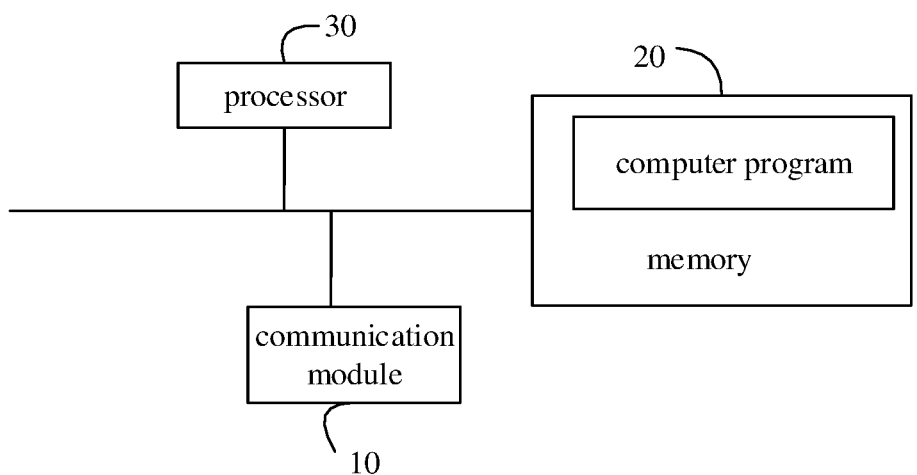
FIG. 1 is a schematic structural diagram of a hardware of a display terminal according to an embodiment of the present disclosure.

As shown in FIG. 1, FIG. 1 is a schematic structural diagram of a hardware of a display terminal according to an embodiment of the present disclosure.

The display terminal includes a communication module 10, a memory 20, a processor 30 and other components in a hardware structure. In the display terminal, the processor 30 is respectively connected to the memory 20 and the communication module 10. A computer program is stored in the memory 20, and the computer program is executed by the processor 30. When the computer program is executed, the operations of the following method embodiments are implemented.

The communication module 10 can be communicated with external communication device via a network. The communication module 10 can receive requests sent by the external communication device, and can also send requests, instructions, and information to the external communication device. The external communication device can be a user terminal or other system server or the like.

The memory 20 can be used to store software programs and various data. The memory 20 can mainly include a program storage area and a data storage area. The program storage area can store an operating system, an application program required by at least one function (for example, obtaining an initial current value corresponding to a current light intensity value of TV and a target current value corresponding to a target light intensity value in the light intensity adjustment request), or the like. The data storage area can include a database, and the data storage area can store data or information according to the use of the display terminal. In addition, the memory 20 can include a high-speed random access memory, and can also include a non-volatile memory, such as at least one magnetic disk storage device, a flash memory device, or other volatile solid-state storage devices.

The processor 30 is the control center of the display terminal, which utilizes various interfaces and lines connect each part of the entire display terminal. By running or executing the software programs and/or modules stored in the memory 20, and calling the data stored in the memory 20, various functions and processing data of the display terminal are executed, and then the display terminal is monitored as a whole. The processor 30 can include one or more processing units. In an embodiment, the processor 30 can integrate an application processor and a modem processor. The application processor mainly deals with the operating system, user interface and application programs, and the modem processor mainly deals with wireless communication. It can be understood that the above-mentioned modem processor may not be integrated into the processor 30.

Although not shown in FIG. 1, the above-mentioned display terminal can also include a circuit control module for connecting with a power source to ensure the normal operation of other components. Those skilled in the art should understand that the structure of the display terminal shown in FIG. 1 does not constitute a limitation on the display terminal, and can include more or fewer components, a combination of some components, or differently arranged components than shown in the figure.

Based on the above hardware structure, various embodiments of the method of the present disclosure are proposed.

Figure 2:
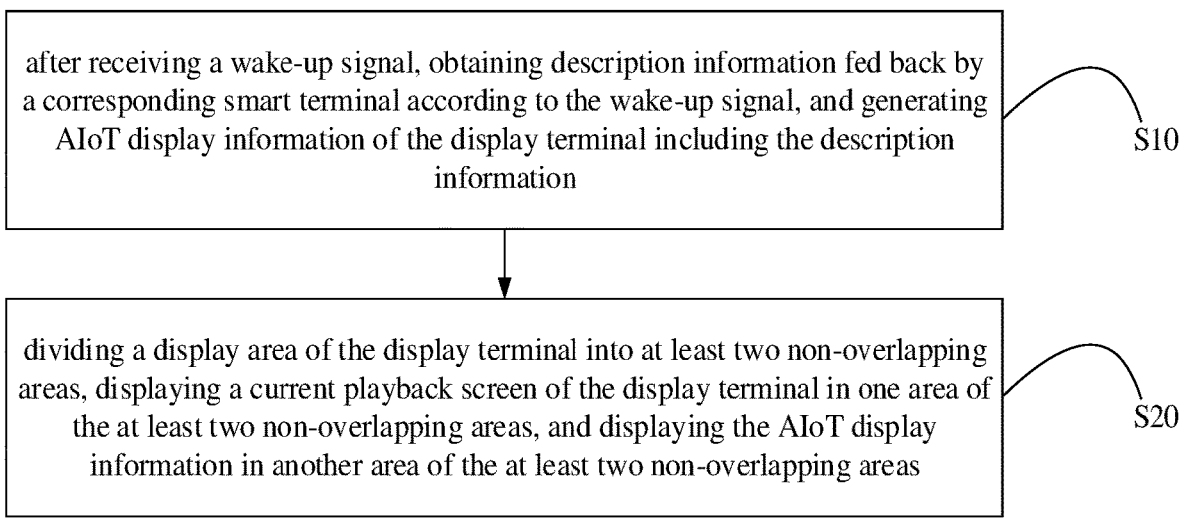
FIG. 2 is a schematic flowchart of a display method according to a first embodiment of the present disclosure.

As shown in FIG. 2. FIG. 2 is a schematic flowchart of a display method according to a first embodiment of the present disclosure. In this embodiment, the method includes:

Operation S10, after receiving a wake-up signal, obtaining description information fed back by a corresponding smart terminal according to the wake-up signal, and generating AIoT display information of the display terminal including the description information.

In this embodiment, AIoT refers to the combination of artificial intelligence technology and Internet of Things technology. With the development of artificial intelligence technology, traditional Internet of Things devices will tend to be intelligent, thus forming the artificial intelligence Internet of Things (AIoT), making the "Internet of Everything" evolve to the "Intelligent Internet of Everything". In the AIoT era, "voice+screen" has become the entrance and center of the intelligent Internet of Things. For smart homes in the AIoT era, because of the family's public nature (family sharing), a "public screen" is needed to become the entrance and center of the whole house's intelligent Internet of Things. In the era of AIoT smart homes, all "public screens" (screens of home TVs, range hoods, or the like) in the whole house are empowered to realize multi-screen interconnection. Each "public screen" in the home is the entrance to the AIoT ecosystem, and any "public screen" can realize voice interaction with smart devices in the whole house. The smart large screen in the living room at the core of the house will be the most perfect "public screen" in the family.

In this embodiment, the display terminal can be a TV or an associated smart terminal with display function. Both the user and the associated smart terminal can send a wake-up signal to the display terminal. When the wake-up signal is detected, the wake-up signal sent by the outside world is received, and the description information fed back by the corresponding smart terminal is obtained according to the wake-up signal. The corresponding smart terminal can be the display terminal itself that receives the wake-up signal or the associated smart terminal that sends the wake-up signal. It is necessary to further obtain the description information fed back by the corresponding smart terminal according to the wake-up signal, and then generate the AIoT display information containing the description information. The description information is obtained through the wake-up signal, and then the AIoT display information is generated, thereby further presenting the AIoT display information to the user.

Operation S20, dividing a display area of the display terminal into at least two non-overlapping areas, displaying a current playback screen of the display terminal in one area of the at least two non-overlapping areas, and displaying the AIoT display information in another area of the at least two non-overlapping areas.

In this embodiment, when displaying the AIoT information, the display area of the current display terminal needs to be divided into at least two areas that do not affect each other and do not overlap each other. It can be understood that the display area of the TV is divided into at least two non-overlapping areas, the current TV program being played by the TV is displayed in one area of the at least two non-overlapping areas, and the AIoT display information is displayed in the other area of the at least two non-overlapping areas. In fact, the current TV program is scaled down without affecting the clarity. The scaled down TV program can still be viewed normally without affecting the picture quality, and then the scaled down TV program is displayed in a divided display area.

In this embodiment, after receiving wake-up signal, the description information fed back by the corresponding smart terminal according to the wake-up signal is obtained, and the AIoT display information of the display terminal including the description information is generated; and the display area of the display terminal is divided into at least two non-overlapping areas, the current playback screen of the display terminal is displayed in one area of the at least two non-overlapping areas, and the AIoT display information is displayed in another area of the at least two non-overlapping areas. By dividing the display area, the TV program being played and the AIoT display information are displayed together in two non-overlapping display areas. When the AIoT display information is presented to the user, the TV program being played will not be affected, and the AIoT display information will not cover the TV program being played when it appears, and will not affect the normal viewing of the user.

Figure 3:
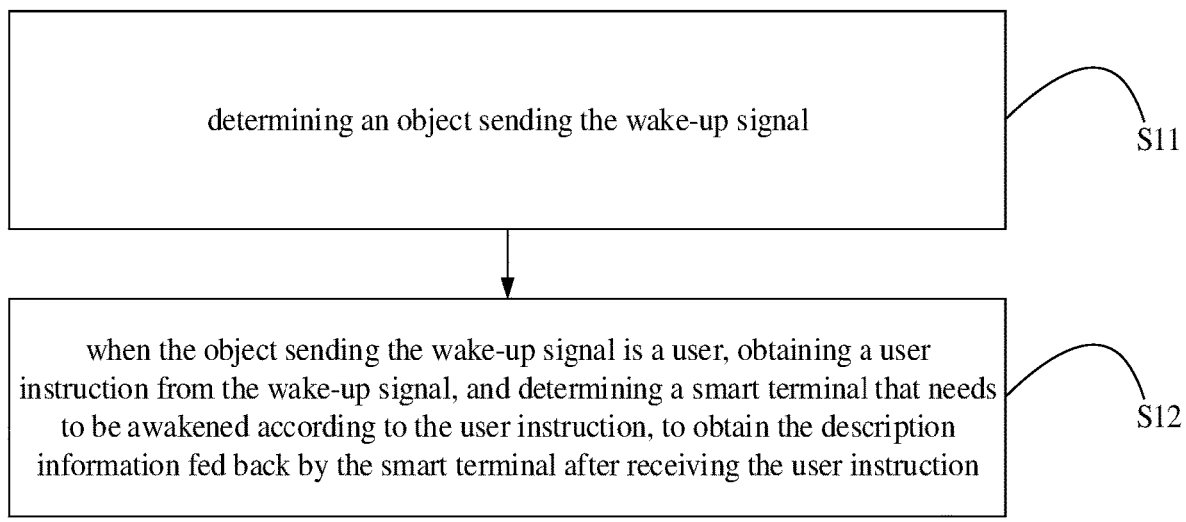
FIG. 3 is a schematic flowchart of a display method according to a second embodiment of the present disclosure.

In an embodiment, the display method of a second embodiment of the present disclosure is provided based on the display method of the first embodiment of the present disclosure. In this embodiment, as shown in FIG. 3, the operation of obtaining description information fed back by a corresponding smart terminal according to the wake-up signal in operation S10 includes:

Operation S11, determining an object sending the wake-up signal; and

Operation S12, when the object sending the wake-up signal is a user, obtaining a user instruction from the wake-up signal, and determining a smart terminal that needs to be awakened according to the user instruction, to obtain the description information fed back by the smart terminal after receiving the user instruction.

In this embodiment, either the user or the associated smart terminal can send the wake-up signal. After receiving the wake-up signal, it is necessary to further determine whether the object sending the wake-up signal is the user or the associated smart terminal. The user can send the wake-up signal directly through voice. For example, when the user wants to check the weather forecast, the user can input voice to check the weather or weather forecast. When the object sending the wake-up signal is the user, the user instruction is obtained from the wake-up signal. The user instruction at this time is to check the weather and determine the smart terminal that needs to be awakened according to the user instruction. When the user needs to check the weather, the corresponding smart terminal that needs to be awakened is the TV itself, and the TV feeds back description information after receiving the user instruction. The TV receives the user instruction to check the weather and feeds back the weather forecast for the user. The text information of the weather forecast can be presented to the user during the feedback, and the voice broadcast can also be carried out.

In this embodiment, the instruction input by the user includes an action instruction and a non-action instruction. For example, when the user instruction is a weather forecast, the TV only needs to call the local content to present the weather content to the user, and the user instruction is the non-action instruction. In an embodiment, the smart terminal that needs to be awakened is the TV itself, and the description information fed back by the TV is obtained after receiving the user instruction. For example, when the user instruction is to open the curtain, the TV needs to send the instruction to the associated smart terminal that controls the curtain to close, and the user instruction is the action instruction. In an embodiment, the smart terminal that needs to be awakened is an associated smart terminal that controls the closing of the curtain, and the description information fed back by the associated smart terminal that controls the closing of the curtain is obtained after receiving the user instruction. It can be understood that the user instruction that can be completed by the TV itself is the non-action instruction, and the TV needs to send the instruction to the associated smart terminal, and the smart terminal completes the instruction, and the user instruction at this time is the action instruction.

In an embodiment, as shown in FIG. 4, the operation S11 further includes:

Operation S13, when the object sending the wake-up signal is an associated smart terminal, obtaining prompt information corresponding to the associated smart terminal, and using the prompt information as obtained description information fed back by the corresponding smart terminal.

In this embodiment, the user or the associated smart terminal can send the wake-up signal. After receiving the wake-up signal, it is necessary to further determine whether the object sending the wake-up signal is the user or the associated smart terminal. When the object sending the wake-up signal is the associated smart terminal, it means that the associated smart terminal has completed a user-specified event at this time, and the user needs to be reminded that the event has been completed. The prompt information of the associated smart terminal is obtained, and the prompt information is used as the description information fed back by the smart terminal that sends the wake-up signal. For example, the washing machine has finished washing, the washing machine sends the wake-up signal to the TV, and the TV obtains the prompt information of the washing machine. The prompt information fed back by the washing machine can be that the clothes have been washed, please dry them as soon as possible, or the like, and can also include the instructions for use or maintenance of the washing machine and the instructions for drying and maintaining clothes. The prompt information of washing feedback is used as the description information.

In this embodiment, after receiving the wake-up signal, the object sending the wake-up signal is determined. When the object sending the wake-up signal is the user, the user instruction is obtained from the wake-up signal. The user instruction includes the action instruction and the non-action instruction. It is determined whether the awakened smart terminal is the TV itself or the associated smart terminal according to the user instruction, so as to obtain the description information fed back by the TV or the associated smart terminal after receiving the user instruction, and generate AIoT display information based on the description information. When it is determined that the object sending the wake-up signal is the associated smart terminal, the prompt information of the associated smart terminal is obtained, and the prompt information is used as the description information fed back by the associated smart terminal. The AIoT display information can be generated according to the description information, so that the AIoT display information including the description information is presented to the user, making the way for the user to obtain the information more convenient and faster.

Figure 5:
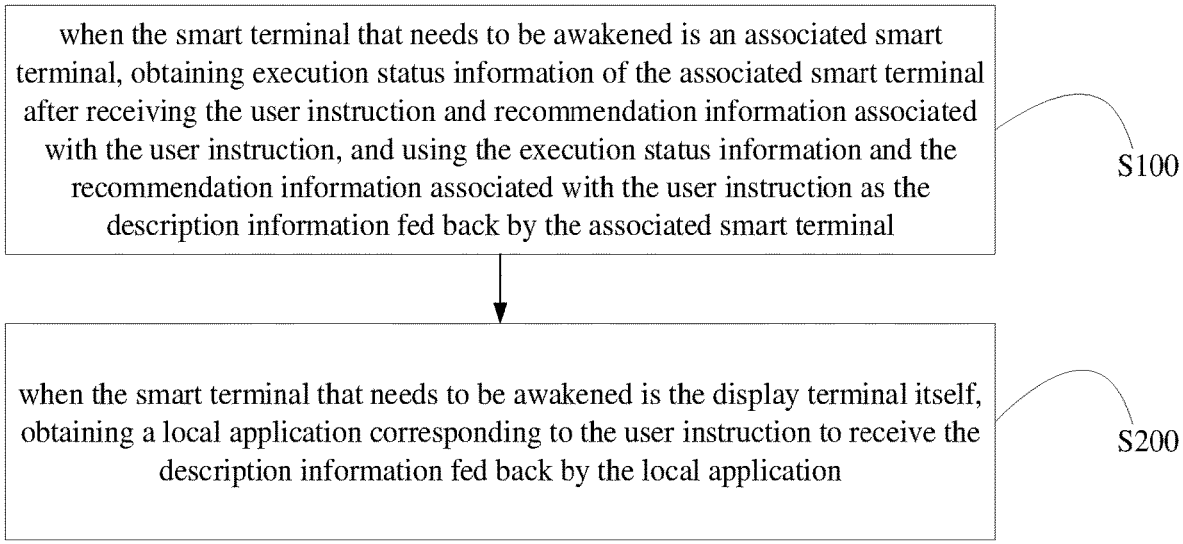
FIG. 5 is a schematic flowchart of the display method according to a third embodiment of the present disclosure.

In an embodiment, the display method of a third embodiment of the present disclosure is provided based on the display method of the second embodiment of the present disclosure. In this embodiment, as shown in FIG. 5, the operation of obtaining the description information fed back by the smart terminal after receiving the user instruction in operation S12 includes:

Operation S100, when the smart terminal that needs to be awakened is an associated smart terminal, obtaining execution status information of the associated smart terminal after receiving the user instruction and recommendation information associated with the user instruction, and using the execution status information and the recommendation information associated with the user instruction as the description information fed back by the associated smart terminal; and Operation S200, when the smart terminal that needs to be awakened is the display terminal itself, obtaining a local application corresponding to the user instruction to receive the description information fed back by the local application.

In this embodiment, the smart terminal to be awakened can be further determined according to the user instruction. When the user instruction is the action instruction, the smart terminal that needs to be awakened is the associated smart terminal. For example, the action instruction is to open the curtain, and the smart terminal that needs to be awakened at this time is the associated smart terminal that controls the closing of the curtain, and obtains the execution status information of the associated smart terminal that controls the closing of the curtain after receiving the user instruction and the recommendation information related to the user instruction. The execution status information can be that the curtain is about to be opened or the curtain is being opened or the curtain has been opened. The execution status information changes with the state of the curtain. Or, the execution status information can directly display that the curtain has been opened when the curtain is opened. The recommendation information related to the user instruction can recommend information that is highly related to the user instruction. For example, the user instruction is to open curtains, and the recommendation information can be outdoor ultraviolet intensity, weather, or the like. According to the current outdoor ultraviolet intensity or weather, it is further recommended that the user needs to bring an umbrella in the recommendation information, and the execution status information and the recommendation information associated with the user are integrated into the description information fed back by the associated smart terminal.

According to the user instruction, the smart terminal that need to be awakened can be further determined. When the user instruction is the non-action instruction, the smart terminal that needs to be awakened is the TV itself. For example, if the user instruction is to check the weather, the TV obtains the local application—the weather app according to the user instruction, and receives the description information fed back by the weather app. The description information at this time can include the highest temperature, the lowest temperature, the current temperature, the humidity, the rainfall probability, the visibility, the ultraviolet index of the day.

In this embodiment, it is determined whether the awakened smart terminal is the TV itself or the associated smart terminal according to the user instruction. When the awakened smart terminal is the TV itself, the local application is obtained and the description information fed back by the local application is received. When the smart terminal that needs to be awakened is the associated smart terminal, the execution status information of the smart terminal after receiving the user instruction and the recommendation information associated with the user instruction are obtained. The execution status information and the recommendation information are integrated into description information, and the description information including the execution status information and the recommendation information is further added to the AIoT display information and presented to the user, to make AIoT display information content more conform to user needs, and make the information content obtained by users more comprehensive and specific.

In an embodiment, the display method of a fourth embodiment of the present disclosure is provided based on the display method of the first embodiment of the present disclosure. In this embodiment, the at least two non-overlapping areas further include a menu display area.

As shown in FIG. 6, before the operation of dividing a display area of the display terminal into at least two non-overlapping areas in operation S20, the display method further includes:

Operation S30, obtaining status information of other associated smart terminals except the smart terminal that feeds back the description information, and sorting icons of all associated smart terminals in a preset order, where the icon of the smart terminal that feeds back the description information is in a first position, after determining the icon in the first position, sorting the icons according to a remaining time in the status information in ascending order or a degree of relevance to the description information; and while performing the operation of displaying the AIoT display information in another area of the at least two non-overlapping areas in operation S20, the following operation is also performed:

Operation S40, displaying the sorted icons in the menu display area.

Figure 7:
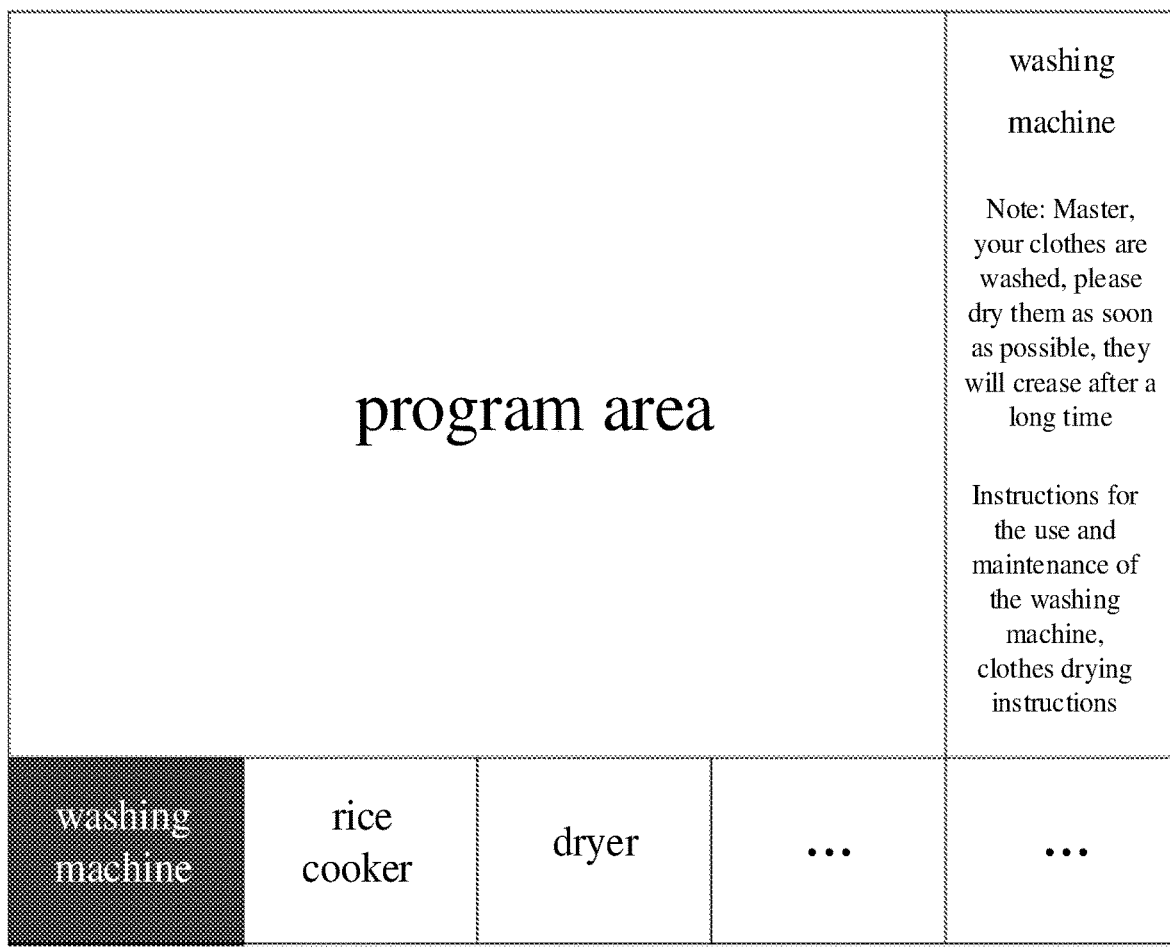
FIG. 7 is a schematic diagram of a display area of a display terminal in the display method according to the fourth embodiment of the present disclosure.

In this embodiment, the display area is divided into at least two non-overlapping areas. The divided display area also includes the menu display area. For example, as shown in FIG. 7, the TV area is divided into three areas, including the program area, the AIoT display area, and the menu display area. Before dividing the display area of the display terminal, the status information of the associated smart terminal other than the smart terminal that feeds back the description information can also be obtained. The status information can be working status information, and it can be further known whether the associated smart terminal is in working status through the status information. When multiple associated smart terminals are in working state, for example, the rice cooker is stewing rice, the dryer is drying clothes, or the like. The icons of the associated smart terminals in the working state can be sorted according to the preset order. When sorting the icons, the icons of the smart terminal that feeds back the description information are ranked in a first position (the icon can also be the device name of the associated smart terminal). Other associated smart terminals that are in working state can be sorted according to the remaining time of work. The icon with the shortest remaining work time is put in the first position, and the icon with the longest work remaining time is put in the last position. For example, the washing machine has finished washing, the remaining time for the rice cooker to cook is 3 minutes, and the remaining time for the dryer to work is 5 minutes. As shown in FIG. 7, the washing machine is sorted in the first position according to the urgency of time, and the rice cooker is in front of the dryer. Finally, the sorted icons are displayed in the menu display area. Since the first position is the washing machine, the information in the AIoT display area is the description information corresponding to the washing machine, including that the clothes have been washed, please dry them as soon as possible, and can also include the washing machine instructions or maintenance instructions and the clothes drying and maintenance instructions. After seeing the sorting of the icons, the user can know which the next associated smart terminal is to finish the work, so that the information content that the user knows is more comprehensive and specific.

Figure 8:
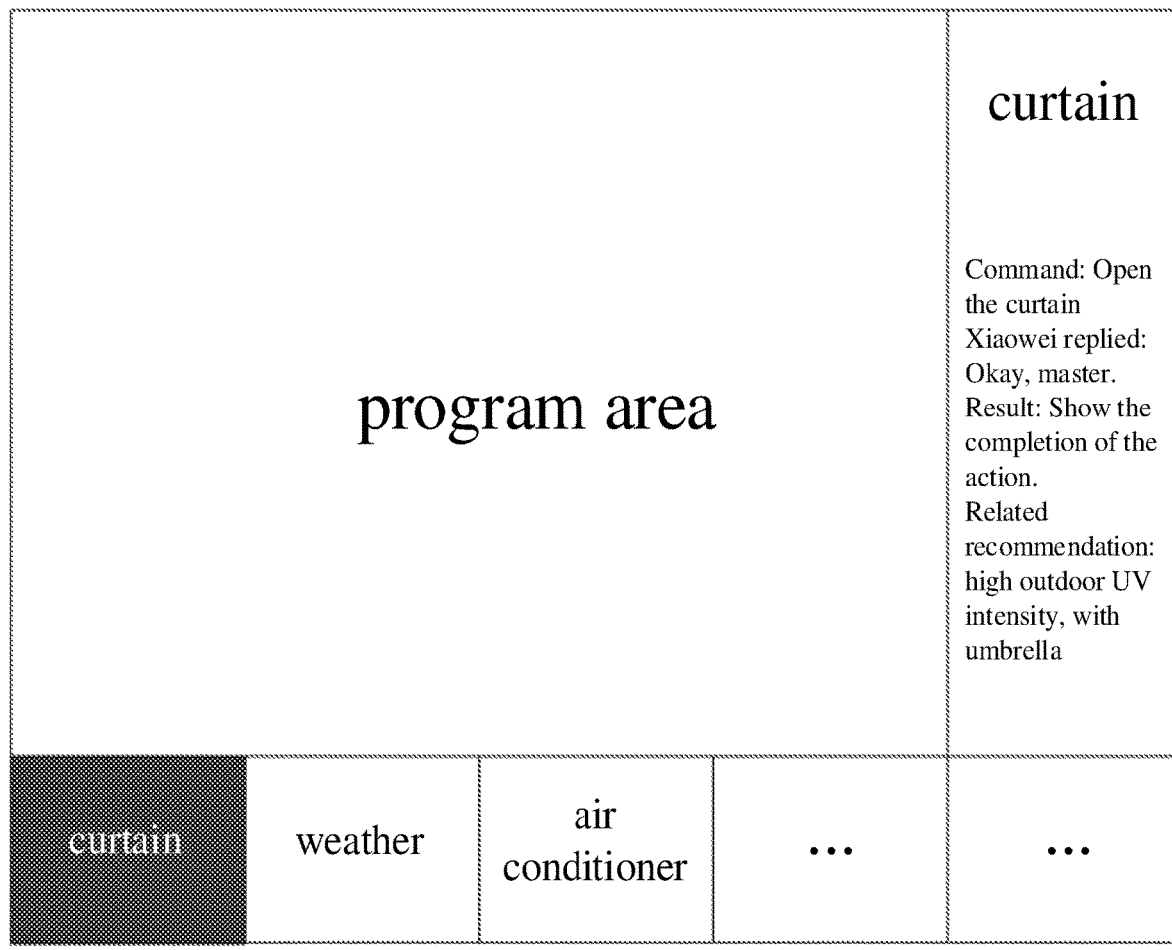
FIG. 8 is a schematic diagram of the display area of the display terminal in the display method according to the fourth embodiment of the present disclosure.

In this embodiment, in addition to sorting by time urgency, icon sorting can also be sorted by relevance. Specifically, after determining the first icon, the information associated with it is searched for according to the description information of the associated smart terminal corresponding to the first icon. For example, as shown in FIG. 8, the icon in the first position is the curtain, the description information in the AIoT display information corresponding to the curtain includes the execution status information and the recommendation information. The execution status information includes contents such as opening curtains and completion status. The recommendation information includes outdoor ultraviolet intensity, umbrella and other information. The AIoT display information involves outdoor ultraviolet intensity. Therefore, the curtain is related to the weather app or air conditioner. The icons of the air conditioner and weather app are placed after the curtain icon, and sorted according to the degree of relevance. For example, the weather app can be arranged after the curtain icon, and the air conditioner after the weather app, and the sorted icons are finally displayed in the menu display area. The user can choose according to the needs after seeing the sorted icons, and the information presented to the user is more humane.

Figure 9:
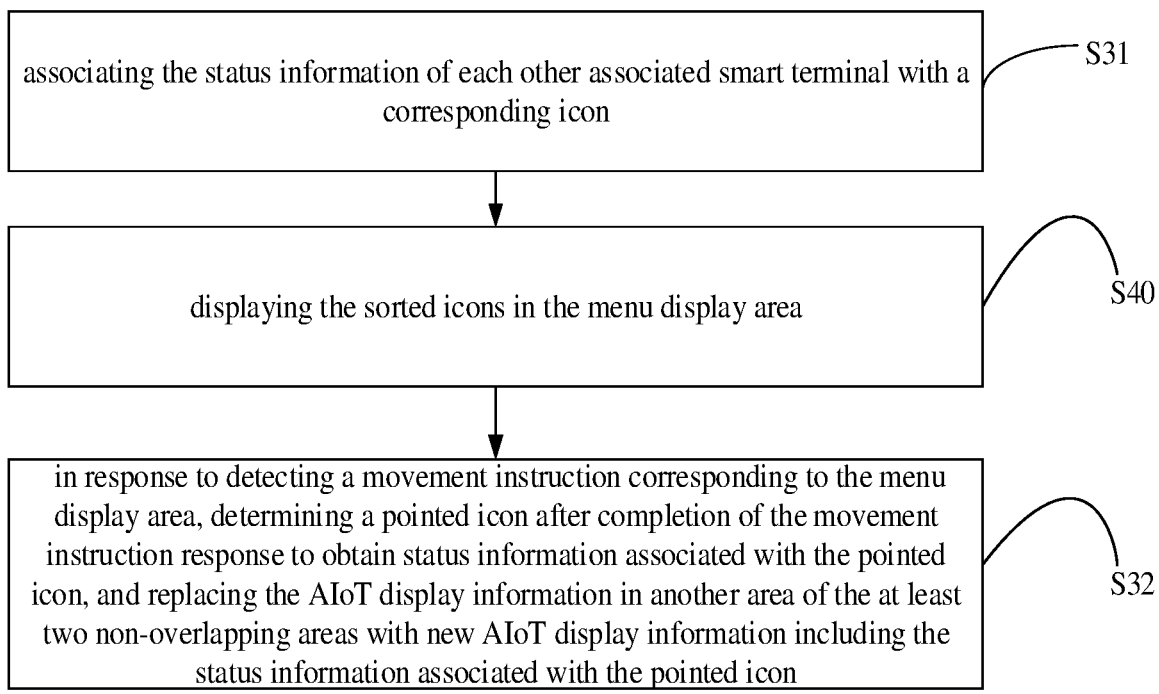
FIG. 9 is a schematic flowchart of the display method according to the present disclosure.

In an embodiment, as shown in FIG. 9, after the operation of obtaining status information of other associated smart terminals except the smart terminal that feeds back the description information in operation S30, the display method further includes:

Operation S31, associating the status information of each other associated smart terminal with a corresponding icon;

after the operation S40, the display method further includes:

Operation S32, in response to detecting a movement instruction corresponding to the menu display area, determining a pointed icon after completion of the movement instruction response to obtain status information associated with the pointed icon, and replacing the AIoT display information in another area of the at least two non-overlapping areas with new AIoT display information including the status information associated with the pointed icon.

Figure 10:
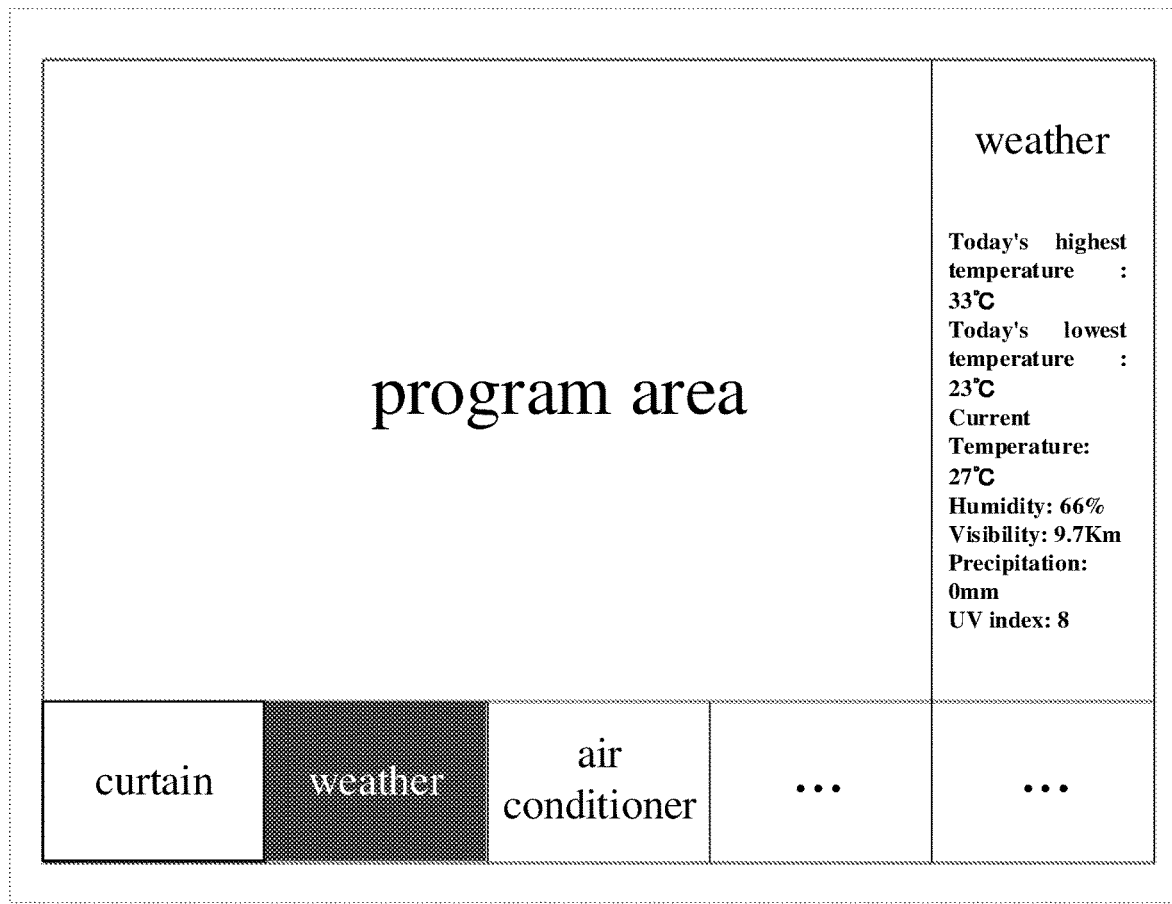
FIG. 10 is a schematic diagram of the display area of the display terminal in the display method according to the fourth embodiment of the present disclosure.

In this embodiment, the smart terminal sending the feedback description information is the TV itself or the associated smart terminal. After obtaining the status information of other associated smart terminals except the smart terminal that feeds back the description information, the status information of each other associated smart terminal is associated with its corresponding icon, and each icon in the menu display area is associated with its status information. After the sorted icons are displayed in the menu display area, whether there is the movement instruction in the menu display area is detected. When the movement instruction corresponding to the menu display area is detected, the corresponding pointed icon is determined after the corresponding completion of the movement instruction. The cursor can be used to point to the icon, or the pointed icon can be set to blink or set a different color to distinguish it from other icons. When determining the pointed icon after completion of the movement instruction response, the status information associated with the pointed icon is obtained, and the AIoT display information in the area where the AIoT display information is displayed is replaced with the new AIoT display information that includes the status information. For example, as shown in FIG. 10, the pointed icon is weather. The AIoT display information displays weather-related status information. Actually, when the content in the icon is the local application of the TV, the status information is its corresponding description information. When the icon is the associated smart terminal, the status information is its working status information. In this embodiment, the AIoT display information is updated in real time according to the icon pointed to by the movement instruction, so that the information obtained by the user is more comprehensive and specific.

Figure 11:
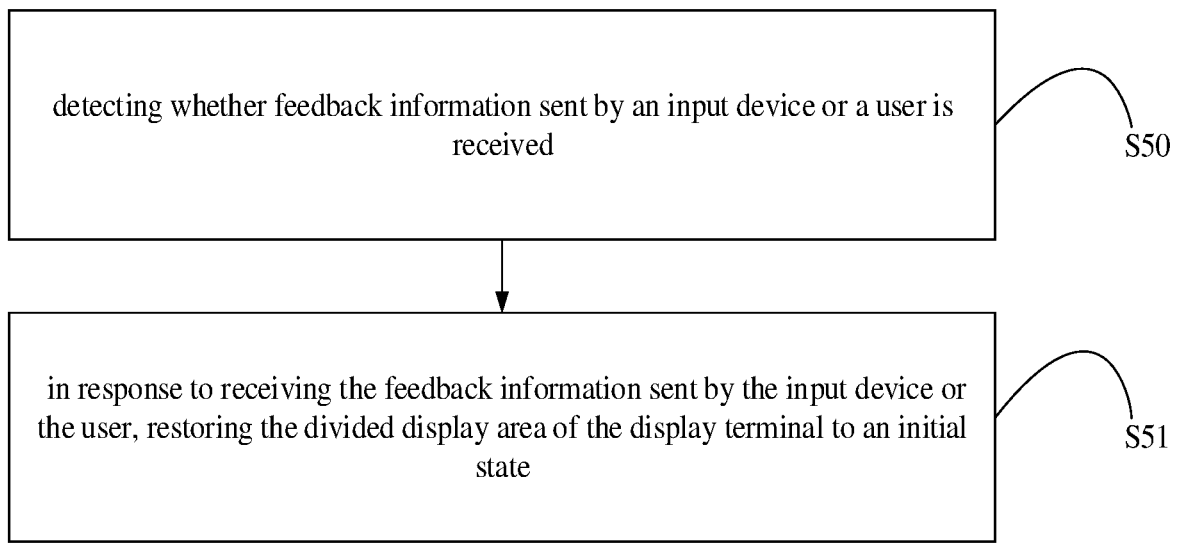
FIG. 11 is a schematic flowchart of the display method according to a fifth embodiment of the present disclosure.

In an embodiment, the display method of a fifth embodiment of the present disclosure is provided based on the display method of the first embodiment of the present disclosure. In this embodiment, as shown in FIG. 11, after the operation of displaying the AIoT display information in another area of the at least two non-overlapping areas in operation S20, the display method further includes:

Operation S50, detecting whether feedback information sent by an input device or a user is received; and Operation S51, in response to receiving the feedback information sent by the input device or the user, restoring the divided display area of the display terminal to an initial state.

In this embodiment, after the AIoT display information is presented to the user, it is detected whether the feedback information sent by the user through the remote control is received or the feedback information sent by the user through voice. When receiving the feedback information sent by the user through the remote control or the feedback information sent by the user through voice, the display area divided by the display terminal is restored to the initial state. The initial state is the state before the display area is divided. In fact, the TV programs broadcast on the TV are enlarged in equal proportions, the division of the display area is canceled, and the TV programs are displayed on the full screen. When the AIoT display information contains prompt information, in order to confirm that the user has seen the prompt information, when receiving the feedback information, it means that the user has already seen the prompt information at this time, and the division of the display area is canceled, so that the TV display interface is restored to the state before the division. After confirming that the user has viewed the AIoT display information, the initial state of the display area is restored to ensure that the user does not miss the prompt information.

Figure 12:
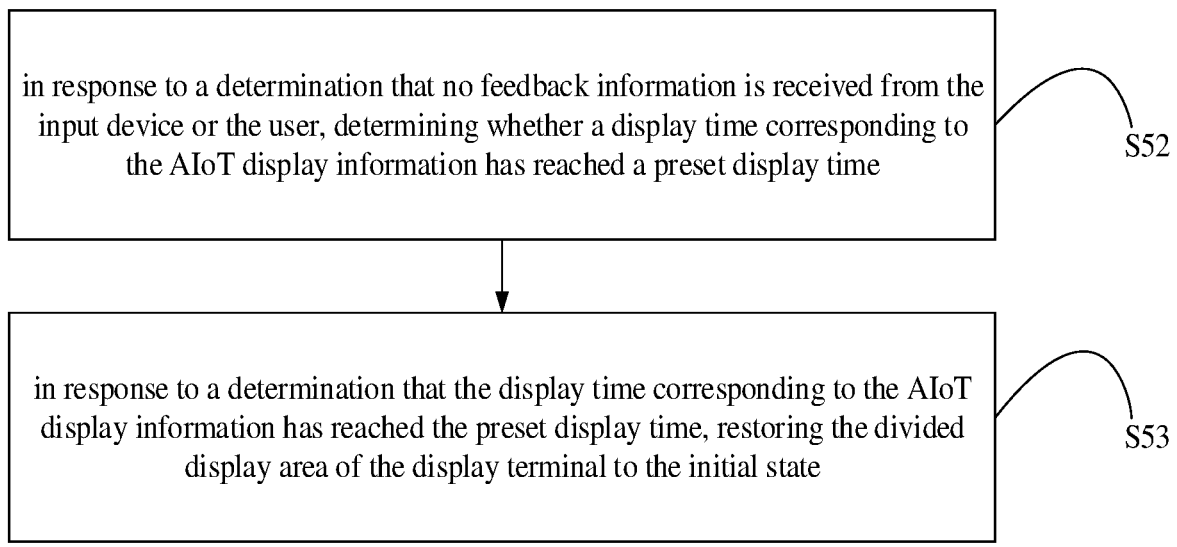
FIG. 12 is a schematic flowchart of the display method according to the present disclosure.

In an embodiment, as shown in FIG. 12, after the operation S50, the display method further includes:

Operation S52, in response to a determination that no feedback information is received from the input device or the user, determining whether a display time corresponding to the AIoT display information has reached a preset display time; and Operation S53, in response to a determination that the display time corresponding to the AIoT display information has reached the preset display time, restoring the divided display area of the display terminal to the initial state.

In this embodiment, after the AIoT display information is presented to the user, it is detected whether the feedback information sent by the user through the remote control or the feedback information sent by the user through voice is received. When no feedback information from the user through the remote control or from the user through voice is received, the display time corresponding to the AIoT display information is obtained. The display time is set by the system or by the user. It is determined whether the display time corresponding to the AIoT display information has reached the preset display time. When the corresponding display time has reached the preset display time, the display area divided by the display terminal is restored to the initial state. The initial state is the state before the display area is divided. In fact, the TV programs broadcast on the TV are enlarged in equal proportions, the division of the display area is canceled, and the TV programs are displayed on the full screen. For example, when the user views the weather, the AIoT display information does not contain prompt information. After the weather information is displayed and broadcast for the preset display time, it will automatically exit and restore the full screen. When the AIoT display information does not contain prompt information, the user does not need to confirm. When the preset display time is reached, the display area is automatically restored to the state before the division, which can reduce user operations.

The present disclosure further provides a non-transitory computer readable storage medium. A computer program is stored in the non-transitory computer readable storage medium. The non-transitory computer readable storage medium can be the memory in the display terminal of FIG. 1, or can be at least one of a Read-Only Memory (ROM)/a Random Access Memory (RAM), a magnetic disk, and an optical disk. The non-transitory computer readable storage medium includes a number of instructions to make a terminal device (a mobile phone, a computer, a server, a terminal, or a network device, or the like) with a processor execute the method described in each embodiment of the present disclosure.

In the present disclosure, the terms "first", "second", "third", "fourth" and "fifth" are only used for descriptive purposes, and cannot be understood as indicating or implying relative importance. For those of ordinary skill in the art, the specific meanings of the above-mentioned terms in the present disclosure can be understood according to specific circumstances.

In the description of this specification, the description of the terms "one embodiment", "some embodiments", "example", "specific example", and "some examples", or the like, means that a specific feature, structure, material, or characteristic described in conjunction with the embodiment or example is included in at least one embodiment or example of the present disclosure. In this specification, the schematic representations of the above terms do not necessarily refer to the same embodiment or example. Moreover, the described specific features, structures, materials or characteristics can be combined in any one or more embodiments or examples in a suitable manner. In addition, those skilled in the art can combine the different embodiments or examples and the features of the different embodiments or examples described in this specification without contradicting each other.

Although the embodiments of the present disclosure have been shown and described above, the scope of the present disclosure is not limited thereto. It can be understood that the above-mentioned embodiments are exemplary and cannot be understood as a limitation of the present disclosure. Those of ordinary skill in the art can make changes, modifications and substitutions to the above-mentioned embodiments within the scope of the present disclosure, and these changes, modifications and substitutions should all be covered by the scope of the present disclosure. Therefore, the scope of the present disclosure shall be subject to the scope of the claims.

What is claimed is:

1. A display method, applied to a display terminal, comprising following operations:
    after receiving a wake-up signal, obtaining description information fed back by a corresponding smart terminal according to the wake-up signal, and generating artificial intelligence and Internet of Things (AIoT) display information of the display terminal comprising the description information; and
    dividing a display area of the display terminal into at least two non-overlapping areas, displaying a current playback screen of the display terminal in one area of the at least two non-overlapping areas, and displaying the AIoT display information in another area of the at least two non-overlapping areas;
    wherein after the operation of displaying the AIoT display information in another area of the at least two non-overlapping areas, the display method further comprises:
    detecting whether feedback information sent by an input device or a user is received; and
    in response to receiving the feedback information sent by the input device or the user, restoring the divided display area of the display terminal to an initial state.

2. The display method of claim 1, wherein the operation of obtaining description information fed back by a corresponding smart terminal according to the wake-up signal comprises:
    determining an object sending the wake-up signal; and
    when the object sending the wake-up signal is a user, obtaining a user instruction from the wake-up signal, and determining a smart terminal that needs to be awakened according to the user instruction, to obtain the description information fed back by the smart terminal after receiving the user instruction.

3. The display method of claim 2, wherein the operation of obtaining the description information fed back by the smart terminal after receiving the user instruction comprises:
    when the smart terminal that needs to be awakened is an associated smart terminal, obtaining execution status information of the associated smart terminal after receiving the user instruction and recommendation information associated with the user instruction, and using the execution status information and the recommendation information associated with the user instruction as the description information fed back by the associated smart terminal; and
    when the smart terminal that needs to be awakened is the display terminal itself, obtaining a local application corresponding to the user instruction to receive the description information fed back by the local application.

4. The display method of claim 2, wherein after the operation of determining an object sending the wake-up signal, the display method further comprises:
    when the object sending the wake-up signal is an associated smart terminal, obtaining prompt information corresponding to the associated smart terminal, and using the prompt information as description information fed back by the corresponding smart terminal.

5. The display method of claim 1, wherein the at least two non-overlapping areas further comprise a menu display area;
    before the operation of dividing a display area of the display terminal into at least two non-overlapping areas, the display method further comprises:
    obtaining status information of other associated smart terminals except the smart terminal that feeds back the description information, and sorting icons of all associated smart terminals in a preset order, wherein an icon of the smart terminal that feeds back the description information is in a first position, after determining the icon in the first position, sorting the icons according to a remaining time in the status information in ascending order or a degree of relevance to the description information; and
    displaying the AIoT display information in another area of the at least two non-overlapping areas and displaying the sorted icons in the menu display area.

6. The display method of claim 5, wherein after the operation of obtaining status information of other associated smart terminals except the smart terminal that feeds back the description information, the display method further comprises:
    associating status information of each other associated smart terminal with a corresponding icon;
    after the operation of displaying the sorted icons in the menu display area, the display method further comprises:
    in response to detecting a movement instruction in the menu display area, determining a pointed icon after completion of the movement instruction to obtain status information associated with the pointed icon, and replacing the AIoT display information in another area of the at least two non-overlapping areas with new AIoT display information comprising the status information associated with the pointed icon.

7. The display method of claim 1, wherein after the operation of detecting whether feedback information sent by an input device or a user is received, the display method further comprises:
    in response to a determination that no feedback information from the input device or the user is received, determining whether a display time corresponding to the AIoT display information has reached a preset display time; and
    in response to a determination that the display time corresponding to the AIoT display information has reached the preset display time, restoring the divided display area of the display terminal to the initial state.

8. The display method of claim 2, wherein the user instruction comprises an action instruction and a non-action instruction.

9. A non-transitory computer readable storage medium, wherein a computer program is stored in the non-transitory computer readable storage medium, the computer program, when executed by a processor, performs the operations of the display method of claim 1.

10. A display terminal, comprising: a communication module, a memory, a processor, and a computer program stored in the memory and executed by the processor, the computer program, when executed by the processor, performs following operations:
    after receiving wake-up signal, obtaining description information fed back by a corresponding smart terminal according to the wake-up signal, and generating AIoT display information of the display terminal comprising the description information; and dividing a display area of the display terminal into at least two non-overlapping areas, displaying a current playback screen of the display terminal in one area of the at least two non-overlapping areas, and displaying the AIoT display information in another area of the at least two non-overlapping areas;

wherein when the computer program is executed by the processor, after the operation of displaying the AIoT display information in another area of the at least two non-overlapping areas, following operations are further performed:

detecting whether feedback information sent by an input device or a user is received; and in response to receiving the feedback information sent by the input device or the user, restoring the divided display area of the display terminal to an initial state.

11. The display terminal of claim 10, wherein when the computer program is executed by the processor, the operation of obtaining description information fed back by a corresponding smart terminal according to the wake-up signal comprises:

determining an object sending the wake-up signal; and when the object sending the wake-up signal is a user, obtaining a user instruction from the wake-up signal, and determining a smart terminal that needs to be awakened according to the user instruction, to obtain the description information fed back by the smart terminal after receiving the user instruction.

12. The display terminal of claim 11, wherein when the computer program is executed by the processor, the operation of obtaining the description information fed back by the smart terminal after receiving the user instruction comprises:

when the smart terminal that needs to be awakened is an associated smart terminal, obtaining execution status information of the associated smart terminal after receiving the user instruction and recommendation information associated with the user instruction, and using the execution status information and the recommendation information associated with the user instruction as the description information fed back by the associated smart terminal; and when the smart terminal that needs to be awakened is the display terminal itself, obtaining a local application corresponding to the user instruction to receive the description information fed back by the local application.

13. The display terminal of claim 11, wherein when the computer program is executed by the processor, after the operation of determining an object sending the wake-up signal, following operation is further performed:

when the object sending the wake-up signal is an associated smart terminal, obtaining prompt information corresponding to the associated smart terminal, and using the prompt information as description information fed back by the corresponding smart terminal.

14. The display terminal of claim 10, wherein when the computer program is executed by the processor, the at least two non-overlapping areas further comprise a menu display area;

before the operation of dividing a display area of the display terminal into at least two non-overlapping areas, following operations are further performed:

obtaining status information of other associated smart terminals except the smart terminal that feeds back the description information, and sorting icons of all associated smart terminals in a preset order, wherein an icon of the smart terminal that feeds back the description information is in a first position, after determining the icon in the first position, sorting the icons according to a remaining time in the status information in ascending order or a degree of relevance to the description information; and displaying the AIoT display information in another area of the at least two non-overlapping areas and displaying the sorted icons in the menu display area.

15. The display terminal of claim 14, wherein when the computer program is executed by the processor, after the operation of obtaining status information of other associated smart terminals except the smart terminal that feeds back the description information, following operations are further performed:

associating status information of each other associated smart terminal with a corresponding icon;

after the operation of displaying the sorted icons in the menu display area, the display method further comprises:

in response to detecting a movement instruction in the menu display area, determining a pointed icon after completion of the movement instruction to obtain status information associated with the pointed icon, and replacing the AIoT display information in another area of the at least two non-overlapping areas with new AIoT display information comprising the status information associated with the pointed icon.

16. The display terminal of claim 10, wherein when the computer program is executed by the processor, after the operation of detecting whether feedback information sent by an input device or a user is received, following operations are further performed:

in response to a determination that no feedback information from the input device or the user is received, determining whether a display time corresponding to the AIoT display information has reached a preset display time; and in response to a determination that the display time corresponding to the AIoT display information has reached the preset display time, restoring the divided display area of the display terminal to the initial state.

17. The display terminal of claim 11, wherein the user instruction comprises an action instruction and a non-action instruction.

* * * * *